(12) United States Patent
Singh et al.

(10) Patent No.: US 8,630,288 B2
(45) Date of Patent: Jan. 14, 2014

(54) HIERARCHICAL ISOLATED LEARNING AND FLOODING FOR METRO ETHERNET BRIDGING DOMAINS

(75) Inventors: Bijendra Singh, Plano, TX (US); Arun Saha, Sunnyvale, CA (US); Mandar Joshi, San Jose, CA (US); Abinder S. Dhillon, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 503 days.

(21) Appl. No.: 12/781,531

(22) Filed: May 17, 2010

(65) Prior Publication Data

US 2011/0280248 A1    Nov. 17, 2011

(51) Int. Cl.
*H04L 12/28*    (2006.01)

(52) U.S. Cl.
USPC .............................. 370/389; 370/392; 370/401

(58) Field of Classification Search
USPC .................. 370/254, 256, 389, 392, 400, 401
See application file for complete search history.

(56) References Cited

U.S. PATENT DOCUMENTS

| | | | | |
|---|---|---|---|---|
| 5,946,308 | A * | 8/1999 | Dobbins et al. | 370/392 |
| 7,389,359 | B2 * | 6/2008 | Jain et al. | 709/238 |
| 7,489,682 | B2 * | 2/2009 | Kubota | 370/389 |
| 7,519,056 | B2 * | 4/2009 | Ishwar et al. | 370/389 |
| 7,548,541 | B2 * | 6/2009 | Ishwar et al. | 370/390 |
| 7,586,895 | B2 * | 9/2009 | Borgione | 370/349 |
| 7,796,594 | B2 * | 9/2010 | Melman et al. | 370/389 |
| 7,813,337 | B2 * | 10/2010 | Akyol et al. | 370/388 |
| 7,877,508 | B1 * | 1/2011 | Jain et al. | 709/238 |
| 7,995,499 | B2 * | 8/2011 | Sharma et al. | 370/254 |
| 8,027,262 | B2 * | 9/2011 | Kawarai et al. | 370/241 |
| 8,089,963 | B2 * | 1/2012 | Melman et al. | 370/389 |
| 8,208,463 | B2 * | 6/2012 | Yadav et al. | 370/389 |
| 2005/0265356 | A1 * | 12/2005 | Kawarai et al. | 370/395.53 |

* cited by examiner

*Primary Examiner* — Brian O'Connor
(74) *Attorney, Agent, or Firm* — Baker Botts L.L.P.

(57) ABSTRACT

A switch includes a processor coupled to a memory, one or more forwarding tables residing within the memory, and one or more ports. The ports are associated with a plurality of virtual local area networks and a plurality of bridge domains. Each of the bridge domains is associated with one of the forwarding tables, and each of the forwarding tables is associated with one of the bridge domains. The processor is configured to assign a first tag to a received packet, assign a second tag to the received packet, look up the destination address of the received packet in one of the forwarding tables, and selectively flood the ports of the active bridge domain with a copy of the received packet. The active bridge domain includes one of the plurality of bridge domains. The active bridge domain is associated with the ingress port of the received packet.

17 Claims, 4 Drawing Sheets

HIERARCHICAL ISOLATED LEARNING AND FLOODING FOR METRO ETHERNET BRIDGING DOMAINS

TECHNICAL FIELD OF THE INVENTION

The present invention relates generally to networked communications and, more particularly, to a hierarchical isolated learning, forwarding and flooding for metro Ethernet bridging domains.

BACKGROUND

In distributed switching systems, switching entities perform packet forwarding, forwarding entry learning, and aging out of forwarding entries. If a switching entity is associated with multiple Virtual Local Area Networks ("VLANs"), each VLAN may have its own forwarding table. This Ethernet switch architecture is based upon VLANs, and the switching functionality is implemented by keeping VLANs as the center of the architecture. Most of the core switching functionalities such as Ethernet host learning, packet forwarding and packet flooding are carried out on a per-VLAN basis. This architecture requires that most of the configuration to operate a switch needs to be applied on a per-VLAN basis and must be repeated for each VLAN.

SUMMARY

In one embodiment, a switch includes a processor coupled to a memory, one or more forwarding tables residing within the memory, and one or more ports. The one or more ports are associated with a plurality of virtual local area networks. The one or more ports are associated with a plurality of bridge domains. Each of the bridge domains is associated with one of the forwarding tables, and each of the forwarding tables is associated with one of the bridge domains. The processor is configured to assign a first tag to a received packet, the first tag comprising an identification of an active bridge domain, assign a second tag to the received packet, look up the destination address of the received packet in one of the forwarding tables, and if the destination address is not found in the forwarding table, and selectively flood the one or more ports of the active bridge domain with a copy of the received packet. The active bridge domain includes one of the plurality of bridge domains. The active bridge domain is associated with the ingress port of the received packet. The second tag includes an identification of one of the plurality of virtual local area networks.

In a further embodiment, a method for networked communications includes receiving a packet, assigning a first tag to a received packet, the first tag comprising an identification of an active bridge domain, assigning a second tag to the received packet, looking up the destination address of the received packet in a forwarding table, and if the destination address is not found in the forwarding table, selectively flooding the one or more ports of the active bridge domain with a copy of the received packet. The second tag includes an identification of one of the plurality of virtual local area networks. The active bridge domain includes one of the plurality of bridge domains. The active bridge domain is associated with the ingress port of the received packet.

In yet a further embodiment, an article of manufacture includes a computer readable medium and computer-executable instructions carried on the computer readable medium. The instructions are readable by a processor. The instructions, when read and executed, cause the processor to assign a first tag to a received packet, assign a second tag to the received packet, the second tag comprising an identification of one of the plurality of virtual local area networks, look up the destination address of the received packet in a forwarding table, and if the destination address is not found in the forwarding table, selectively flood the one or more ports of the active bridge domain with a copy of the received packet. The first tag includes an identification of an active bridge domain. The active bridge domain includes one of the plurality of bridge domains. The active bridge domain is associated with the ingress port of the received packet.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
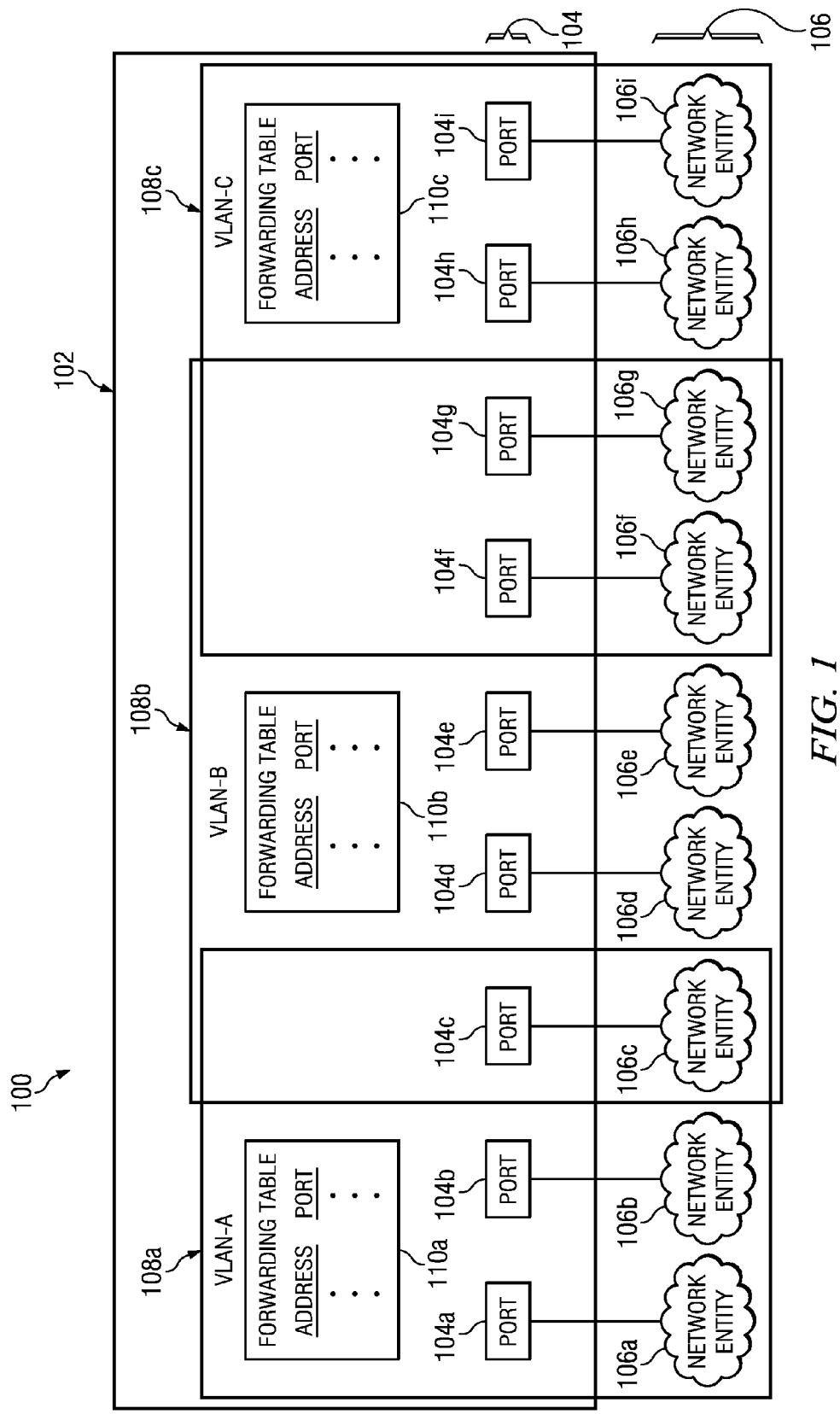
FIG. 1 is an example of a typical switching system based upon a switch configured to operate with one or more Virtual Local Area Networks.

FIG. 1 is an example of a typical switching system 100 based upon a switch 102 configured to operate with one or more Virtual Local Area Networks (VLANs) 108. Switch 102 comprises one or more ports 104, each coupled to one or more network entities 106. VLANs 108 comprise a virtual grouping of the one or more ports 104 coupled to one or more network entities 106. Each VLAN 108 also comprises a forwarding table 110 specific to the individual VLAN 108. The forwarding table 110 comprises communication and forwarding information regarding network entities connected to ports 104 both within and without the VLAN for which the VLAN has learned forwarding addresses. In one embodiment, the addresses may comprise media access control ("MAC") addresses. Communication with network entities 106 connected to a given VLAN 108 is controlled by the settings and information contained within the VLAN 108. As packets of information are received into a given VLAN 108 to be forwarded to a network entity, the destination of the packet will be looked up in forwarding table 110 to determine which port 104 the packet should be sent. Information in forwarding table 110 is populated as packets of information are received into a given VLAN 108. As packets are received, the VLAN 108 learns about the identities of the sender upon recipient of the packet, and stores the information in the forwarding table 110 specific to the VLAN 108. If no entry in forwarding table 110 corresponds to the address to be located, the packet to be forwarded is flooded to all ports 104.

Figure 2:
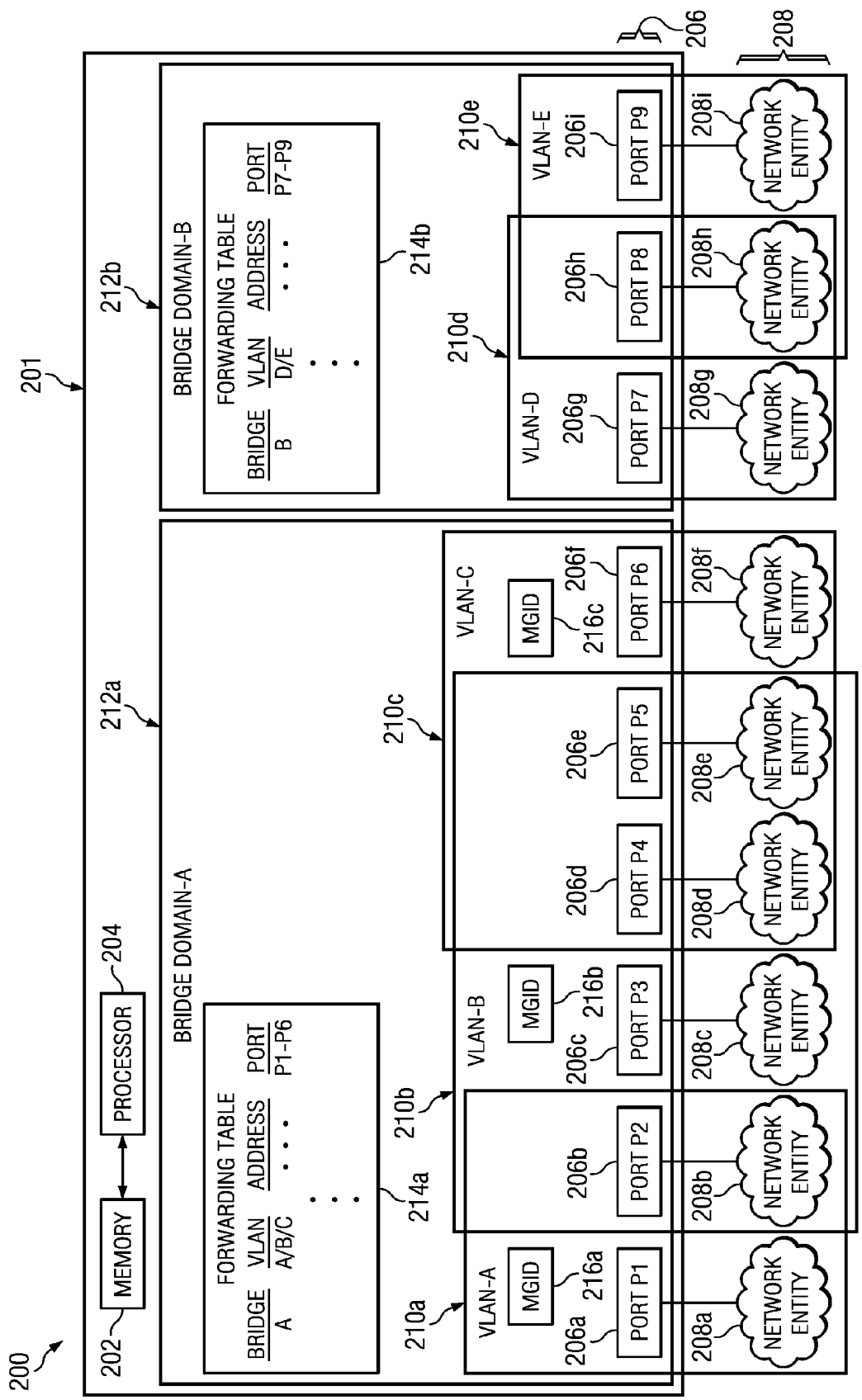
FIG. 2 is an example embodiment of a switching system based upon a hierarchical isolated learning and flooding scheme for metro Ethernet bridging domains.

FIG. 2 is an example embodiment of a switching system 200 based upon a hierarchical isolated learning and flooding scheme for metro Ethernet bridging domains. A switch 201 may be configured to receive and forward packets of information from and to one or more network entities 208. Switch 201 may comprise one or more ports 206 which may be communicatively coupled to one or more network entities 208. Ports 206 may comprise a unique identification. Switch 201 may comprise a processor 204 coupled to a memory 202. Network entities 208 may comprise an electronic device, a subnetwork, a network, or any other suitable entity configured to receive and send packets of information to and from switch 201. Each of network entities 208 may comprise entities that are communicatively coupled or not from each other. Each of network entities 208 may comprise one or more of the other network entities 208.

Processor 204 may comprise, for example, a microprocessor, microcontroller, digital signal processor (DSP), application specific integrated circuit (ASIC), or any other digital or analog circuitry configured to interpret and/or execute program instructions and/or process data. Processor 204 may interpret and/or execute program instructions and/or process data stored in memory 202. Memory 202 may comprise any system, device, or apparatus configured to hold and/or house one or more memory modules. Each memory module may include any system, device or apparatus configured to retain program instructions and/or data for a period of time (e.g., computer-readable media).

VLAN 210 may comprise one or more of ports 206. Ports 206 may be associated with one or more VLANs 210. VLANs 210 may be associated with one or more network entities 208 communicatively coupled to the ports 206 which comprise the VLAN 210. VLANs 210 may be associated with a multicast group identification (MGID) 216. MGID 216 may comprise an identification of all ports 206 associated with a VLAN 210.

Switch 201 may comprise one or more bridge domains 212. A bridge domain 212 may be a virtual organization of some or all of the VLANs 210 of the switch 201. Each bridge domain 212 may comprise ports 206 associated with one or more VLANs 210. For example, in FIG. 2, switch 201 may comprise bridge domain 212a and bridge domain 212b. Bridge domain 212a may comprise ports 206a, 206b, 206c, 206d, 206e, 206f, and comprise VLAN 210a, VLAN 210b, and VLAN 210c. Likewise, bridge domain 212b may comprise ports 206g, 206h, 206i, and comprise VLAN 210d and VLAN 210e. In one embodiment, bridge domain 212 may comprise a metro Ethernet bridge domain.

Bridge domain 212 may comprise forwarding table 214. Forwarding table 214 may be implemented in any suitable manner to store and make available to switch 201 through bridge domain 212 information concerning other network entities 208 in switching system 200 and how the network entities 208 may be accessed through ports 206. Forwarding table 214 may comprise information about that may span multiple VLANs 210 within the bridge domain 212. In one embodiment, a single forwarding table 214 may be necessary for all VLANs 210 in a bridge domain 212

In one embodiment, forwarding table 214 may be implemented partially or fully in hardware in switch 201. In such an embodiment, forwarding table 214 may be implemented partially or fully by processor 204. In another embodiment, forwarding table 214 may be implemented partially or fully in memory 202. Forwarding table 214 may be operable by logic or instructions contained within memory 202, and executed by processor 204.

Forwarding table 214 may comprise information, for a given address, identifying what ports 206 may be used to access the device having the address. The addresses used by forwarding table 214 may comprise MAC addresses. In one embodiment, forwarding table 214 may comprise information regarding for a given VLAN 210, which ports 206 may be used to access the VLAN. Forwarding table 214 may comprise the necessary forwarding information specific to a given bridge domain 212.

Figure 3:
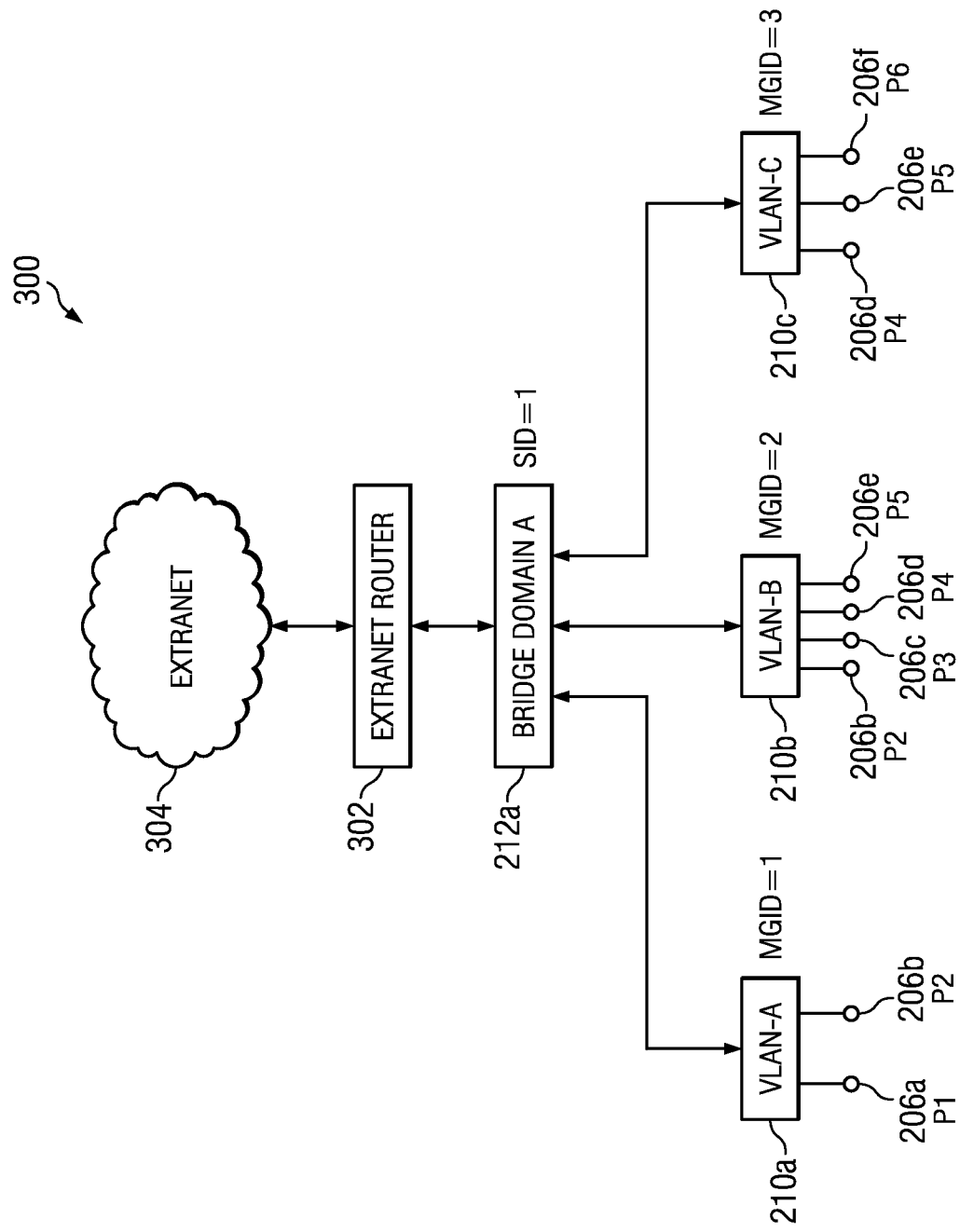
FIG. 3 is an illustration of how a bridge domain included within a switch may be configured for receiving and forwarding packets of information.

FIG. 3 is an illustration of how a bridge domain 212 associated with switch 201 may be configured for receiving and forwarding packets of information. The configuration and operation of bridge domain 212 may be carried out by instructions residing within memory 202 by execution by or within processor 204 of switch 201. The ports 206 of switch 201 associated with a bridge domain 212 may be communicatively coupled to an extranet 304. In one embodiment, the ports 206 of switch 201 associated with a bridge domain 212 may be communicatively coupled to extranet through an extranet router 304. Extranet 304 may comprise any network external to the network of switch 201 for which bridge domain 212 receives packets and sends packets. In one embodiment, extranet 304 may comprise a portion of the Internet. In another embodiment, extranet 304 may comprise a backbone telecommunications network.

Bridge domain 212 may be configured to receive packets from extranet router 302. Extranet router 302 may be configured to receive packets from extranet 304. Extranet router 302 may comprise any router suitable to send and receive packets from extranet 304 and bridge domain 212. In one embodiment, extranet router 302 may be implemented within switch 201. In another embodiment, extranet router 302 may be implemented in an electronic device coupled to switch 201. Extranet router 302 may be configured to add a tag to received packets. In one embodiment, extranet router 302 may be configured to add a tag to the packet representing the bridge domain 212 to which the packet belongs. In another embodiment, extranet router 302 may be configured to add a tag to the packet representing the VLAN 210 inside the bridge domain 212 to which the packet belongs. In yet another embodiment, extranet router 302 may be configured to perform network address translation ("NAT") from an externally visible Internet protocol ("IP") address and layer 4 protocol port to an internal known IP address, and possibly a different layer 4 protocol port. Any suitable method may be used to perform NAT, or reverse NAT, including methods to which a private IP address and protocol port number are translated into a public IP address and protocol port number, or vice versa.

Bridge domain 212 may be configured to receive packets from a VLAN 210. Based on the port 206 through which the packet was received into switch 201, the packet will enter a bridge domain 212. Bridge domain 212 may be configured to add a tag to the received packet, representing bridge domain 212. In one embodiment, bridge domain 212 may be configured to also add a tag to the received packet representing the VLAN 210 where the packet is to be sent.

Upon receipt of a packet, a bridge domain 212 may be configured to determine the source address of the packet. The source address may comprise a MAC address. If the source address of the packet is not found in its forwarding table 214, a bridge domain 212 may be configured to add the source address to forwarding table 214, along with the ingress port through which the packet was received. A bridge domain 212 may be configured to determine, by accessing the destination address of a received packet and accessing its forwarding table 214, to which port 206 the packet should be sent. If the destination address of the packet cannot be found, the bridge domain 212 may be configured to selectively flood the VLANs 210 associated with the bridge domain 212. In one embodiment, bridge domains 212 may be configured to flood all the ports 206 associated with the VLAN 210 identified by the tag associating the packet with the particular VLAN 210. If the destination address of the packet can be found in forwarding table 214, bridge domains 212 may be configured to forward the packet to the appropriate destination through the associated port 206 identified in forwarding table 214.

In one embodiment, bridge domains 212 may be configured to flood all the ports 206 associated with the VLAN 210 identified by the tag associating the packet with the particular VLAN 210 by applying egress VLAN filtering logic. A bridge domain 212 may be configured to determine, for each port 206 associated with the bridge domain 212, whether the port 206 is associated with the particular VLAN 210. If the particular VLAN 210 is configured on port 206, then the packet may be forwarded through port 206. If the particular VLAN 210 is not configured on port 206, then the packet may be dropped. In another embodiment, if the packet was received from a particular VLAN 210, the packet may not be flooded back to the same VLAN 210. Bridge domains 212 may be configured to learn the address, identity, or ports of destinations within a given VLAN 210 by receipt of reply messages or packets in response to flooding ports 206. Bridge domains 212 may be configured to add entries to forwarding table 214 based upon these received packets. The entries may include the source address of the replying destination, as well as the ingress port through which the packet was received.

In one embodiment, a bridge domain 212 may be configured to receive a packet that is to be forwarded to extranet 304. In such an embodiment, the bridge domain 212 may be configured to remove tags of the packet associated with identifying the bridge domain 212. The bridge domain 212 may be configured to forward the packet to extranet router 202. Extranet router 302 may be configured to conduct reverse NAT on the packet. Any known NAT mechanism may be used to conduct NAT or reverse NAT on the packet. Extranet router 302 may be configured to remove tags of the packet associated with associating the packet with VLAN 210. Extranet router 302 may be configured to send the packet to a destination in extranet 304.

In one embodiment, switching system 200 may be configured to separate traffic between different cloud applications. Cloud applications may be operating on or more network entities 208. Switching system 200 may be configured to prevent traffic from one cloud application from reaching another cloud application. Such configurations may improve security of operations of cloud applications, as they may decrease the chances of a security breach in one cloud application from affecting other cloud applications. Cloud applications may be configured to operate on a single VLAN 210, or on a defined set of VLANs 210. Because bridge domains 212 may be configured to only flood packets to ports 206 associated with a given VLAN 210, bridge domains 212 may be configured to only flood packets to VLANs 210 associated with a particular cloud application, thus preventing other cloud applications on other VLANs from receiving the flooded packets.

In operation, extranet router 302 may receive a packet from extranet 304 to be forwarded to a network destination 208 communicatively coupled to a port 206 associated with a bridge domain 212. Extranet router 302 may conduct NAT on the destination address of the packet. The destination address of the packet may comprise an IP address. In one embodiment, extranet router 302 may tag the packet with an identification of the VLAN 210 to which the packet is associated. The packet may then be handled by the associated bridge domain. For example, the packet may be associated with VLAN 210*a*. Extranet router 302 may determine to which bridge domain 212 the packet belongs. In one embodiment, extranet router 302 may use the arrival port 206 of the packet to determine to which bridge domain 212 that the packet belongs. For example, if a packet arrives over port 206*f*, then the packet may be handed off to bridge domain 212*a*; if a packet arrives over port 206*i*, then the packet may be handed off to bridge domain 212*b*. The bridge domain 212 which receives the packet may then tag the packet with an identification of the bridge domain.

A bridge domain 212 may receive the packet from extranet router 302. A bridge domain 212 may be operating on switch 201. A bridge domain 212 may receive a packet from a network entity 208 communicatively coupled to a bridge domain 212 through port 206 configured to operate as part of VLAN 210. The bridge domain 212 which receives the packet may then tag the packet with an identification of the bridge domain. In one embodiment, a bridge domain 212 may tag the packet with a VLAN tag corresponding to an identification of the VLAN 210 through which the packet was received.

Upon receipt of a packet, a bridge domain 212 may look up the source address of the packet in forwarding table 214. The source address may comprise a MAC address. If the source address is not contained within forwarding table 214, the address may be added to forwarding table 214. For example, if a packet arrives at bridge domain 212*a* through port 206*f*, with an address of 00:23:45:67:89:AB, and no entry in forwarding table 214*a* exists for the combination of one or more of the address, VLAN, and bridge identifiers, a new entry may be created in forwarding table 214*a* associating an entry including a particular bridge domain, VLAN, and address 00:23:45:67:89:AB, associating the entry with port 206*f*.

Upon receipt of a packet, a bridge domain 212 may look up the destination address of the packet in forwarding table 214. The destination address may comprise a MAC address. A bridge domain 212 may use any combination of bridge, VLAN, or address identifiers to look up the destination address of the packet in forwarding table 214. If the destination address of the packet is found in forwarding table 214, the packet may be forwarded to the port associated with the found address entry. For example, if bridge domain 212*a* receives a packet tagged with VLAN 210*b*, looks up the destination address of the packet, 00:76:54:32:10:BA, in forwarding table 214*a*, and determines that no corresponding entry exists in forwarding table 214*a*, a copy of the packet may be selectively flooded to ports 206*b-e*. In one embodiment, the packet may be selectively flooded by determining, at each port 206 associated with the bridge domain 212, whether the packet is tagged for a VLAN 210 that is configured as associated with the port 206. If the VLAN 210 is not configured for the port 206, then the packet is dropped. If the VLAN 210 is configured for the port 206, then the packet is forwarded through port 206 to network entity 208. In another embodiment, a packet is not flooded through a port 206 through which the packet was received by bridge domain 212.

If the destination address of the packet is found in forwarding table 214, the packet may be sent to the port 206 corresponding to the found entry in forwarding table 214. For example, if the destination address is 00:11:11:11:11:AA, corresponding to network entity 208*a*, bridge domain 212*a* may access forwarding table 214*a* to determine the port associated with an entry for the address and VLAN 210*a*, and forward the packet to port 206*a*.

If the packet is to be sent to extranet 304, a bridge domain 212 may send the packet to extranet router 302. A bridge domain 212 may remove the tag of the packet identifying bridge domain 212 before sending the packet. Extranet router 302 may be remove the tag of the packet identifying a VLAN. Extranet router 302 may perform reverse NAT. Extranet router 302 may send the packet to a destination in extranet 304.

The systems and embodiments of FIGS. 2 and 3 may be more flexible than a VLAN-centric switch architecture, and better suited to meet the requirements of large metro Ethernet networks and large-scale data centers with many thousands of network entities connected to a switch.

Figure 4:
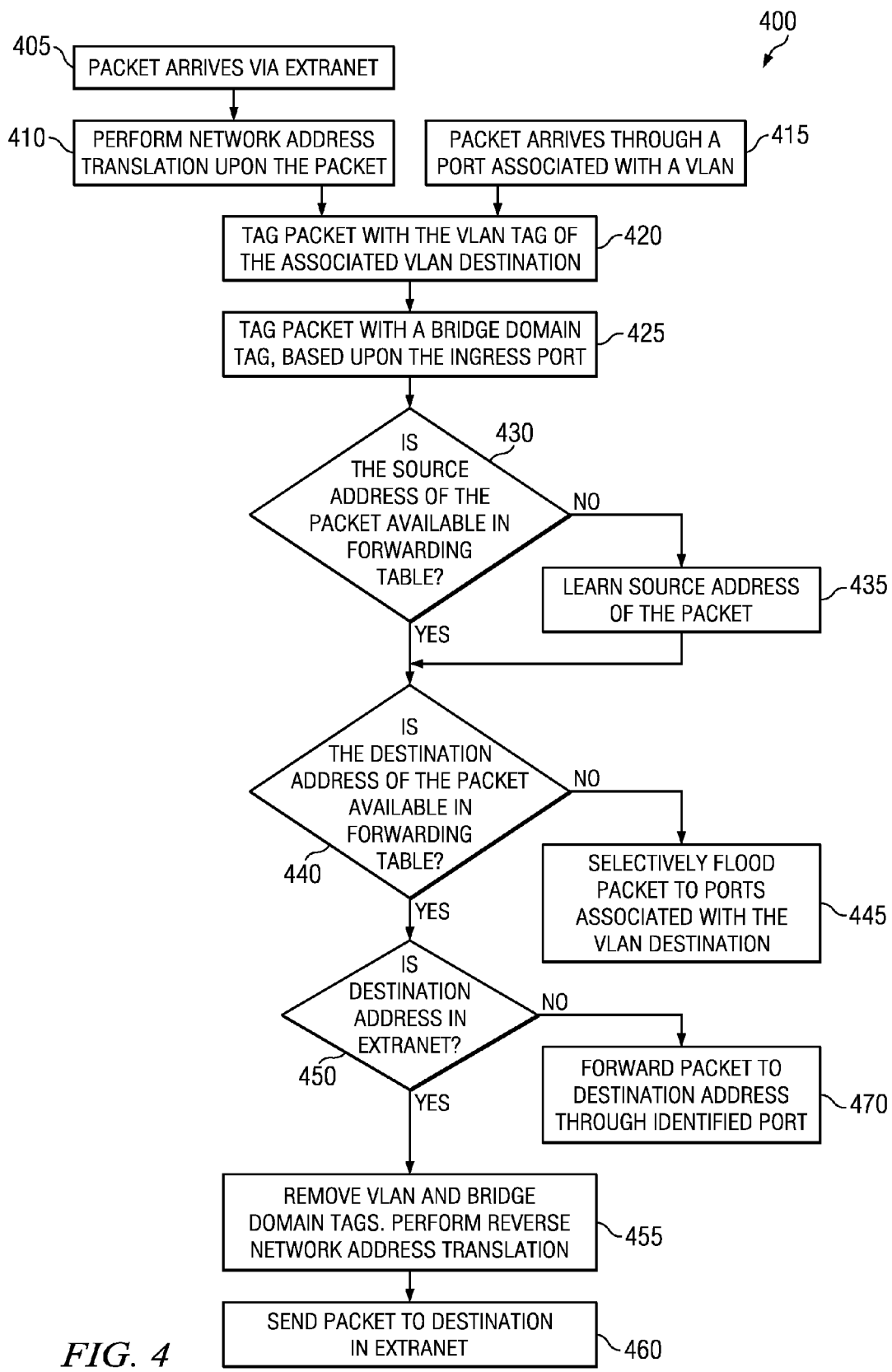
FIG. 4 is an example embodiment of a method for hierarchical isolated learning and flooding for metro Ethernet bridging domains.

FIG. 4 is an example embodiment of a method 400 for hierarchical isolated learning and flooding for metro Ethernet bridging domains. In step 405, a packet may arrive at a switch via an extranet. In step 410, NAT may be performed upon that packet. Steps 405-410 describe a manner in which a packet may arrive via an extranet. However, a packet may also arrive via a VLAN in step 415.

Once the packet has arrived, in step 420 the packet may be tagged with an indication of the VLAN to which the packet is to be sent. In one embodiment, if the packet arrived via a VLAN in step 415, the packet may be tagged with an indication of the VLAN through which the packet arrived. In step 425, the packet may be tagged with an indication of the bridge domain in which the packet has arrived. In one embodiment, the bridge domain corresponding to the ingress port of the packet's arrival may be the bridge domain for which the packet is tagged.

In step 430, the source address of the packet may be looked up in a forwarding table, to determine whether or not the source address is known. The source address may be looked up in a forwarding table on the basis of a combination of any of the source address, the VLAN, or the bridge domain identifiers. In step 435, if the source address is not known, then the source address may be learned by creating a new entry in the forwarding table corresponding to the source address of the packet. In one embodiment, the new entry may also contain information regarding the VLAN or bridge domain identifiers. If the source address is known, then the method may proceed to step 440.

In step 440, the destination address of the packet may be looked up in a forwarding table to determine whether or not the destination address is known. The destination address may be looked up in a forwarding table on the basis of a combination of any of the source address, the VLAN, or the bridge domain identifiers. If the destination address of the packet is not in the forwarding table, then in step 445 the packet may be selectively flooded to ports associated with the destination VLAN. In one embodiment, the packet may be selectively flooded by flooding the packet to all ports, and for each port, determining whether or not the port is configured as part of the destination VLAN. If the destination address of the packet is in the forwarding table, then the appropriate egress port may be determined and the method may proceed to step 450.

In step 450, it may be determined whether or not the destination address is in the extranet or not. If the destination address is not in the extranet, the method may proceed to step 465. If the destination address is in the extranet, then in step 455 the VLAN and bridge domain tags may be removed from the packet. Reverse NAT may be performed upon the packet. In step 460, the packet may be sent to the destination in the extranet.

In step 465, the packet may be forwarded to the destination address through the identified port.

Although FIG. 4 discloses a particular number of steps to be taken with respect to example method 400, method 400 may be executed with more or fewer steps than those depicted in FIG. 4. In addition, although FIG. 4 disclose a certain order of steps to be taken with respect to method 400, the steps comprising method 400, 500 may be completed in any suitable order.

Methods 400 may be implemented using the system of FIGS. 2-3, or any other system, network, or device operable to implement method 400. In certain embodiments, method 400 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A switch, comprising:
a processor coupled to a memory;
one or more forwarding tables residing within the memory;
one or more ports, wherein:
the one or more ports are associated with a plurality of virtual local area networks;
the one or more ports are associated with a plurality of bridge domains;
each of the bridge domains is associated with one of the forwarding tables, and each of the forwarding tables is associated with one of the bridge domains; and
wherein the processor is configured to:
assign a first tag to a received packet, the first tag comprising an identification of an active bridge domain, wherein:
the active bridge domain comprises one of the plurality of bridge domains; and
the active bridge domain is associated with the ingress port of the received packet;
assign a second tag to the received packet, the second tag comprising an identification of one of the plurality of virtual local area networks;
look up the destination address of the received packet in one of the forwarding tables;
based on a determination that in the destination address is not found in the forwarding table, selectively flood the one or more ports of the active bridge domain with a copy of the received packet, comprising:
determining the virtual local area network identified by the second tag of the received packet;
for each of the one or more ports of the of the active bridge domain:
based on a determination that the port is associated with the virtual local area network, forwarding the packet to the port; and
based on a determination that the port is not associated with the virtual local area network, not forwarding the packet to the port.

2. The switch of claim 1, wherein the second tag comprises an identification of a virtual local area network from which the packet was received.

3. The switch of claim 1, wherein the processor is further configured to:

if the destination address is not found in the forwarding table:
receive a reply packet through a port;
create a new entry for the source address of the reply packet, the new entry comprising the source address and the port through which the packet was received.

4. The switch of claim 1, wherein the processor is further configured to:
if the destination address is found in the forwarding table, forward the received packet to a port associated with the destination address in the forwarding table.

5. The switch of claim 1, wherein the processor is further configured to:
look up a source address of the received packet in the forwarding table;
if the source address is not found, create a new entry for the source address of the received packet, the new entry comprising the source address and an identification of one of the plurality of virtual local area networks, the one of the plurality of virtual local area networks associated with the port through which the packet was received.

6. The switch of claim 1, wherein the processor is further configured to remove the first tag and the second tag before forwarding the packet to a network destination residing within an extranet, the extranet communicatively coupled to the switch.

7. A method for networked communications, the method comprising:
receiving a packet;
assigning a first tag to a received packet, the first tag comprising an identification of an active bridge domain, wherein:
the active bridge domain comprises one of the plurality of bridge domains; and
the active bridge domain is associated with the ingress port of the received packet;
assigning a second tag to the received packet, the second tag comprising an identification of one of the plurality of virtual local area networks;
looking up the destination address of the received packet in a forwarding table;
based on a determination that the destination address is not found in the forwarding table, selectively flooding the one or more ports of the active bridge domain with a copy of the received packet comprising:
determining the virtual local area network identified by the second tag of the received packet;
for each of the one or more ports of the of the active bridge domain:
based on a determination that the port is associated with the virtual local area network, forwarding the packet to the port; and
based on a determination that the port is not associated with the virtual local area network, not forwarding the packet to the port.

8. The method of claim 7, wherein the second tag comprises an identification of a virtual local area network from which the packet was received.

9. The method of claim 7, further comprising:
if the destination address is found in the forwarding table, forwarding the received packet to a port associated with the destination address in the forwarding table.

10. The method of claim 7 further comprising:
looking up a source address of the received packet in the forwarding table;
if the source address is not found, creating a new entry for the source address of the received packet, the new entry comprising the source address and an identification of one of the plurality of virtual local area networks, the one of the plurality of virtual local area networks associated with the port through which the packet was received.

11. The method of claim 7, further comprising:
looking up a source address of the received packet in the forwarding table;
if the source address is not found, creating a new entry for the source address of the received packet, the new entry comprising the source address and an identification of one of the plurality of virtual local area networks, the one of the plurality of virtual local area networks associated with the port through which the packet was received.

12. The method of claim 11, further comprising removing the first tag and the second tag before forwarding the packet to a network destination residing within an extranet.

13. An article of manufacture comprising:
a non-transitory computer readable medium; and
computer-executable instructions carried on the non-transitory computer readable medium, the instructions readable by a processor, the instructions, when read and executed, for causing the processor to:
assign a first tag to a received packet, the first tag comprising an identification of an active bridge domain, wherein:
the active bridge domain comprises one of the plurality of bridge domains; and
the active bridge domain is associated with the ingress port of the received packet;
assign a second tag to the received packet, the second tag comprising an identification of one of the plurality of virtual local area networks;
look up the destination address of the received packet in a forwarding table;
based on a determination that the destination address is not found in the forwarding table, selectively flood the one or more ports of the active bridge domain with a copy of the received packet, comprising:
determine the virtual local area network identified by the second tag of the received packet;
for each of the one or more ports of the of the active bridge domain:
based on a determination that the port is associated with the virtual local area network, forward the packet to the port; and
based on a determination that if the port is not associated with the virtual local area network, not forward the packet to the port.

14. The article of claim 13, wherein the second tag comprises an identification of a virtual local area network from which the packet was received.

15. The article of claim 13, wherein the processor is further caused to:
if the destination address is found in the forwarding table, forward the received packet to a port associated with the destination address in the forwarding table.

16. The article of claim 13, wherein the processor is further caused to:
look up a source address of the received packet in the forwarding table;
if the source address is not found, create a new entry for the source address of the received packet, the new entry comprising the source address and an identification of one of the plurality of virtual local area networks, the one of the plurality of virtual local area networks associated with the port through which the packet was received.

17. The article of claim 13, wherein the processor is further configured to:
- look up a source address of the received packet in the forwarding table;
- if the source address is not found, create a new entry for the source address of the received packet, the new entry comprising the source address and an identification of one of the plurality of virtual local area networks, the one of the plurality of virtual local area networks associated with the port through which the packet was received.

* * * * *

UNITED STATES PATENT AND TRADEMARK OFFICE
CERTIFICATE OF CORRECTION

PATENT NO. : 8,630,288 B2  
APPLICATION NO. : 12/781531  
DATED : January 14, 2014  
INVENTOR(S) : Bijendra Singh et al.

Page 1 of 1

It is certified that error appears in the above-identified patent and that said Letters Patent is hereby corrected as shown below:

In the Claims

Column 8, Line 49, Claim 1:   After "determination that" and before "the destination address" delete "in".

Column 8, Line 55, Claim 1:   After "more ports of the" and before "active" delete "of the".

Column 9, Line 50, Claim 7:   After "more ports of the" and before "active" delete "of the".

Column 10, Line 45, Claim 13:   After "more ports of the" and before "active" delete "of the".

Signed and Sealed this  
Eleventh Day of November, 2014

Michelle K. Lee  
*Deputy Director of the United States Patent and Trademark Office*